(12) United States Patent
Rytter

(10) Patent No.: US 7,987,875 B2
(45) Date of Patent: Aug. 2, 2011

(54) FLEXIBLE PIPE, ITS MANUFACTURE AND USE

(75) Inventor: Jan Rytter, Svenstrup (DK)

(73) Assignee: NKT Flexibles I/S, Brondby (DK)

( * ) Notice: Subject to any disclaimer, the term of this patent is extended or adjusted under 35 U.S.C. 154(b) by 1048 days.

(21) Appl. No.: 11/631,930

(22) PCT Filed: Jul. 1, 2005

(86) PCT No.: PCT/EP2005/053143
§ 371 (c)(1),
(2), (4) Date: Jan. 8, 2007

(87) PCT Pub. No.: WO2006/005689
PCT Pub. Date: Jan. 19, 2006

(65) Prior Publication Data
US 2008/0283138 A1    Nov. 20, 2008

(30) Foreign Application Priority Data

Jul. 8, 2004 (DK) .................................. 2004 01077
Jan. 7, 2005 (DK) .................................. 2005 00031

(51) Int. Cl.
*F16L 11/00* (2006.01)
(52) U.S. Cl. ........ 138/130; 138/125; 138/129; 138/133; 138/135
(58) Field of Classification Search .................. 138/125, 138/133, 130, 135, 129
See application file for complete search history.

(56) References Cited

U.S. PATENT DOCUMENTS

| | | | | |
|---|---|---|---|---|
| 3,481,368 | A | * | 12/1969 | Vansickle et al. ............ 138/125 |
| 4,343,333 | A | * | 8/1982 | Keister ........................ 138/125 |
| 4,431,034 | A | * | 2/1984 | Abdullaev et al. ........... 138/130 |
| 4,850,395 | A | * | 7/1989 | Briggs ............................ 138/30 |
| 5,176,179 | A | * | 1/1993 | Bournazel et al. ........... 138/130 |
| 5,307,842 | A | | 5/1994 | Lequeux et al. |

(Continued)

FOREIGN PATENT DOCUMENTS

WO    WO 00/36324    6/2000

(Continued)

OTHER PUBLICATIONS

Braga, et al., "Flexible Pipe Sensitivity to Birdcaging and Armor Wire Lateral Buckling," OMAE2004-51090, 23rd International Conference on Offshore Mechanics and Arctic Engineering, Jun. 20-25, 2004, Vancouver, British Columbia, Canada.

(Continued)

*Primary Examiner* — James F Hook
(74) *Attorney, Agent, or Firm* — Pearne & Gordon LLP

(57) ABSTRACT

A flexible, typically un-bonded, armored pipe, and a method manufacturing a flexible pipe. The pipe has a center axis and comprises an inner liner surrounded by a radial armoring and an axial armoring, the radial and axial armoring each comprising at least one armoring layer of armoring profiles wound with winding angles $\alpha_i$ relative to the center axis. The winding angle of the innermost armoring layer $\alpha_{innermost}$ is larger than the winding angle of the outermost armoring layer $\alpha_{outermost}$. The outer radial armoring layer has sufficient strength and flexibility to prevent prohibitively large radial deformations of underlying axial armoring layers without considerably increasing the radial contact pressure on underlying axial armoring layer. At least one fibrous layer, comprising at least two fibrous cords wound on an underlying layer, surrounds the outermost armoring layer. The flexible pipe is useful in terrestrial and/or subsea transport of fluids at elevated temperature and/or pressures.

16 Claims, 4 Drawing Sheets

U.S. PATENT DOCUMENTS

| | | | | |
|---|---|---|---|---|
| 5,813,439 | A | * | 9/1998 | Herrero et al. ............... 138/134 |
| 6,065,501 | A | * | 5/2000 | Feret et al. ................... 138/134 |
| 6,165,856 | A | | 12/2000 | Jiang et al. ................... 438/301 |
| 6,415,825 | B1 | * | 7/2002 | Dupoiron et al. ............. 138/127 |
| 7,445,030 | B2 | * | 11/2008 | Hardy et al. .................. 138/135 |
| 2001/0003992 | A1 | * | 6/2001 | Espinasse ..................... 138/135 |
| 2003/0121559 | A1 | * | 7/2003 | Glejbol et al. ................ 138/135 |
| 2004/0025953 | A1 | | 2/2004 | Fraser et al. .................. 138/133 |

FOREIGN PATENT DOCUMENTS

| | | |
|---|---|---|
| WO | 01/51839 A1 | 7/2001 |
| WO | 03/044414 A1 | 5/2003 |

OTHER PUBLICATIONS

Bectarte, et al., "Instability of Tensile Armour Layers of Flexible Pipes Under External Pressure," OMAE2004-51352, 23rd International Conference on Offshore Mechanics and Arctic Engineering, Jun. 20-25, 2004, Vancouver, British Columbia, Canada.

Novitsky, et al., "Flexible Pipe in Brazilian Ultra-Deepwater Fields—A Proven Solution," 14th Deep Offshore Technology, 2002, Sergio Serta-Technip-Coflexip.

Troina, et al. "A Stragedy for Flexible Risers Analysis Focused on Compressive Failure Mode," 14th Deep Offshore Technology, 2002.

* cited by examiner

FLEXIBLE PIPE, ITS MANUFACTURE AND USE

TECHNICAL FIELD

The present invention relates to a flexible pipe comprising an inner liner surrounded by at least two armouring layers and to the control of axial compression induced by radial deformations of underlying axial armouring layers.

The invention furthermore relates to a method of manufacturing a flexible pipe and to its use.

The invention may e.g. be useful in applications such as the transport of fluids at elevated temperatures and or pressures.

BACKGROUND ART

The following account of the prior art relates to one of the areas of application of the present invention, flexible pipes for marine applications such as the transport of oil or gas or other fluids in a sub-sea environment.

Such a flexible pipe may e.g. comprise an inner liner forming a barrier against outflow of the fluid being transported in the pipe. The inner liner may typically be surrounded by one or more layers of one or more wound armouring profiles. The armouring layers may—depending on the application of the flexible pipe—e.g. be separated by one or more intermediate layers such as membranes. The intermediate layer or layers may be continuous and forming a barrier against outflow of fluids (like the inner liner) or wound and thereby open. The flexible pipe is typically surrounded by an outer layer forming a protective barrier against the outer environment.

In one type of pipes, the armouring layers are not chemically bonded to the inner liner or to possible intermediate membrane layers but can move relative to this or them, which ensures the flexibility of the pipe. This type of pipe is generally termed an 'un-bonded' pipe.

The mentioned type of pipe is e.g. used for the transport of oil and gas at large or intermediate sea depths. The mentioned construction is particularly well suited for the transport of oil from sub sea sources to installations at sea level where the oil is being refined or forwarded for further processing.

Often pipes of the above mentioned type comprise an inner liner surrounded by one or more armouring profiles, which are wound around the inner liner at a large angle, e.g. larger than 80°, relative to the center axis of the pipe. This or these layers primarily compensate radial forces in the pipe structure and are here termed 'radial armouring layers'. The radial armouring layers are surrounded by one or more armouring profiles, which are wound at a considerably smaller angle, e.g. between 25° and 60°, relative to the center axis of the pipe. This or these layers primarily compensate axial forces in the pipe and is/are termed 'axial armouring layers'. The armouring layers are typically made of steel. A pipe of this kind is in general surrounded by an outer layer forming a protective barrier against the outer environment. Such a pipe is e.g. described in WO 00/36324.

To avoid prohibitively large radial deformations of axial armouring layers due to torsion, axial compression or outer pressures, an outer armouring layer is wound at a large angle around the axial armouring layer(s). This armouring layer is made of very flat profiles, which are here termed 'tapes'.

To decrease the contact pressure between the armouring layers, a surrounding armouring layer has hence been made of tapes with a precisely balanced strength and stiffness. An outer radial armouring layer made of such tapes fulfils the function of limiting the radial deformations in axial armouring layers of the flexible pipe without considerably increasing the contact pressure on the underlying axial armouring layers. Tapes of this type are e.g. disclosed in US -2004/0025953 and in U.S. Pat. No. 6,165,586.

To ensure that the tapes have a precisely balanced stiffness and sufficient strength to withstand the load on the tape, they are manufactured in several independent processes, where a given reinforcement material, e.g. polyaromatic (aramide) fibres in a certain number are assembled to cords, which subsequently are embedded in a carrier material, e.g. polyethylene, and formed to a tape of a specific width and thickness on a specific manufacturing tool. This solution is very inflexible with regard to constructional and manufacturing freedom for pipes which are constructed and manufactured for specific applications. It thus requires inappropriately many variants of these tapes to be able to cost-effectively manufacture flexible pipes in dimensions from 2 in. to 16 in. (app. 5.1 cm to app. 40.6 cm) in diameter, suited for pressure loads from 50 to 600 bar for use above or below sea level down to 2000 meters in depth.

DEFINITION OF TERMS

The following terms are used for various elements of the present invention.

FIBER: A unit of matter, either natural or manufactured, that forms the basic element of fabrics, ropes and other textile or fibrous structures. A fiber is characterized by having a length at least 100 times its diameter or width. The term refers to units that can be spun into a yarn or made into a fabric by various methods including weaving, knitting, braiding, felting, and twisting. The essential requirements for fibers to be spun into yarn include a length of at least 5 millimeters, flexibility, cohesiveness, and sufficient strength. Other important properties include elasticity, fineness, uniformity, durability.

FILAMENT: A fiber of an indefinite or extreme length such as found naturally in silk. Manufactured fibers are extruded into filaments that are converted into filament yarn, staple, or tow. Filament is a narrowing class of "fiber", meaning long fiber.

YARN: A generic term for a continuous strand of textile fibers, filaments, or material in a form suitable for twisting, braiding or otherwise intertwining to form a fibrous cord. Yarn occurs in the following forms: (1) a number of fibers twisted together (spun yarn); (2) a number of filaments laid together without twist (a zero-twist yarn); (3) a number of filaments laid together with a degree of twist; (4) a single filament with or without twist (a monofilament); or (5) a narrow strip of material, such as paper, plastic film, or metal foil, with or without twist, intended for use in a cord construction. Yarn is the generic form of an "assembly".

CORD: The product formed by twisting together two or more plied yarns.

YOUNG'S MODULUS or ELASTIC MODULUS: A property of perfectly elastic materials, it is the ratio of change in stress to change in strain within the elastic limits of the material. The ratio is calculated from the stress expressed in force per unit cross sectional area, and the strain expressed as a fraction of the original length. Modulus so calculated is equivalent to the force required to strain the sample 100% of its original length, at the rate prevailing below the elastic limit. The terms 'Young's modulus' and 'elastic modulus' are used interchangeably in the present application.

DISCLOSURE OF INVENTION

The object of the present invention is to provide a relatively simple and easily adaptive scheme for making an outer radial armouring layer of a flexible pipe, the layer having sufficient strength and flexibility to prevent prohibitively large radial deformations of underlying axial armouring layers without considerably increasing the radial contact pressure on underlying axial armouring layers.

The objects of the invention are achieved by the invention described in the accompanying claims and as described in the following.

A flexible armoured pipe:

An object of the invention is achieved according to the invention by a flexible armoured pipe having a center axis and comprising an inner liner surrounded by a radial armouring and an axial armouring, the radial and axial armouring each comprising at least one armouring layer of armouring profiles wound with winding angles $\alpha_i$; relative to the center axis, the at least two armouring layers defining an innermost and an outermost armouring layer relative to the liner wherein the winding angle of the innermost armouring layer $\alpha_{innermost}$ is larger than the winding angle of the outermost armouring layer $\alpha_{outermost}$, the pipe further comprising at least one fibrous layer surrounding the outermost armouring layer wherein the fibrous layer comprises at least two fibrous cords wound on an underlying layer.

In the present context, the terms 'innermost' and 'outermost layer relative to the liner' is taken to mean that the innermost layer is located closer to the liner than the outermost. Further, the innermost and outermost of a group of layers of a certain type, e.g. armouring layers, are the layers (of the group of layers in question) that are located closest to and farthest away from, respectively, the liner.

The purpose of the outer radial armouring layer (termed the fibrous layer) is to limit the radial expansion of the axial armouring (tensile armouring). The relative increase $\Delta r$ in radius $r$ of axial armouring layer(s) is directly proportional to the inner pressure $P_i$ on the fibrous layer from the axial armouring, the winding pitch $L_t$ of the fibrous cords, and inversely proportional to elastic modulus $E_t$ of the fibrous cords, to its cross-sectional area $A_t$, and to the number of cords $N_t$ within a pitch length:

$$\frac{\Delta r}{r} \propto P_i \cdot \frac{L_t}{E_t \cdot A_t \cdot N_t}$$

An advantage of the present invention is that in an application yielding a specific inner pressure from the axial armouring and for a specific cord (having a specific elastic modulus and cross sectional area), the radial expansion of the pipe may be controlled (e.g. held below a specific value) by varying the number of cords and the winding pitch. This has the advantage of providing an improved freedom of construction and manufacturing compared to prior art solutions.

In an embodiment, the innermost armouring layer constitutes or is part of an inner group of layers constituting the radial armouring and providing protection against radial deformations of the flexible pipe originating e.g. from inner and outer operational pressures, outer mechanical actions, etc.

In an embodiment, the outermost armouring layer constitutes or is part of an outer group of layers constituting the axial armouring and providing protection against axial deformations of the flexible pipe.

In an embodiment, the winding angle or angles $\alpha_{inner}$ of the armouring layers of the inner group of layers is/are larger than the winding angle or angles $\alpha_{outer}$ of the armouring layers of the outer group of layers. This combination of angles will limit the contact pressures between the layers, thereby reduce friction and wear, thus maximise flexibility and durability of the pipe.

In an embodiment, the winding angle(s) $\alpha_{inner}$ of the armouring layer(s) of the inner group of layers is/are at least 10° larger than the winding angle(s) $\alpha_{outer}$ of the armouring layer(s) of the outer group of layers, such as at least 20° larger, such as at least 30° larger, such as at least 40° larger, such as at least 50° larger.

In an embodiment, the winding angle(s) $\alpha_{inner}$ of the armouring layer(s) of the inner group of layers is/are in the range 75° to 90°, preferably around 86°.

In an embodiment, the winding angle $\alpha_{outer}$ of the armouring layer(s) of the outer group of layers is/are in the range from 20° to 70°, such as in the range from 25° to 65°, such as in the range from 30° to 60°.

In an embodiment, the winding angle $\alpha_{fibrous}$ of the at least two fibrous cords is adapted to the winding angles $\alpha_i$ of the armouring layers of the inner and outer groups of layers to provide a fibrous armouring layer to protect the axial armouring against radial deformation (e.g. by optimizing $\alpha_{fibrous}$ for a given configuration of the inner and outer groups of layers to achieve that the fibrous layer or layers protect the axial armouring against radial deformation).

In an embodiment, the winding angle $\alpha_{fibrous}$ of the at least two fibrous cords is larger than 70°, such as larger than 80°. In an embodiment, the winding angle $\alpha_{fibrous}$ is in the range from 75° to 90°, such as from 85° to 90°. The effect of a higher angle is a more effective reinforcement against radial expansion of the axial armouring layer(s).

In an embodiment, the underlying layer is an intermediate layer located between the outermost armouring layer and the fibrous layer or the innermost fibrous layer. This has the advantage that the fibrous cords are not in direct contact with the underlying armouring layer whose deformation is to be controlled (limited) by the fibrous cords.

In an embodiment, the pipe further comprises an outer sheath surrounding the at least one fibrous layer.

In an embodiment, the fibrous cords have a Young's modulus smaller than 120 GPa. In an embodiment, the fibrous cords have a Young's modulus in the range from 10 GPa to 120 GPa.

In a particular embodiment, the fibrous cords of the fibrous layer surrounding the outermost armouring layer are made of a material with a stiffness that is lower than that of the material from which the armouring profiles of the innermost, radial armouring layer is made, such as 60% of the stiffness of the armouring profiles or lower, such as 30% or lower or such as 5% or lower. In a preferred embodiment, the stiffness of the fibrous cords is in the range from 5% to 60% of that of the armouring profiles of the radial armouring layer, such as in the range from 20% to 50%. The stiffness may be optimized by a proper choice of materials, number of filaments in a cord, cross-sectional areas, etc.

The stiffness can be expressed in terms of Young's modulus, which is the ratio between stress and relative elongation. For a fibrous cord, this can be expressed as the force on the cord, divided by the total fibre cross sectional area and the relative elongation at that force.

$$E = \frac{F}{A \cdot \varepsilon}$$

The material typically used in the radial armour is steel with a Young's modulus of 200-210 GPa. In that case, it is preferable to apply a fibrous layer made of a material with lesser stiffness, such as 60% of that of steel or lower, such as 30% of steel or lower or such as 5% of steel. Preferably, Young's modulus of the fibrous layer is in the range from 20% to 50% of that of steel.

In an embodiment, the fibrous cords are made of yarn from twisted individual fibres or filaments.

In an embodiment, the individual fibres are selected from the group consisting of polyaromatic fibres, other polymer- or co-polymer based fibres, glass fibres or other inorganic fibres.

In an embodiment, the individual filaments are metallic. In an embodiment, the metallic filaments are made of steel. In an embodiment, the filaments are twisted into yarns. In an embodiment, the yarns are twisted to a cord (e.g. a metallic wire). This has the advantage of e.g. providing a steel wire with a flexibility corresponding to that of e.g. glass fibre.

In a particular embodiment, the fibrous cords may be wound with an axial displacement providing no overlap. In the present context, the term 'displacement' is taken to mean the axial position where a cord meets the pipe relative to other neighbouring cords. In an embodiment, the fibrous cords are wound with an axial displacement providing a certain spacing between neighbouring cords in a wound layer. Alternatively, a part of the fibrous cords are wound with an axial displacement (setting) relative to a corresponding part of fibrous cords to provide an overlap between the fibrous cords.

In an embodiment, some of the layers of the flexible pipe are un-bonded, such as a majority of the layers, preferably all of the layers.

A method of manufacturing a flexible pipe:

An object of the invention is achieved by a method of manufacturing a flexible pipe comprising the steps of
a) providing an inner liner surrounded by a radial armouring and an axial armouring,
b) providing that the radial and axial armouring each comprises at least one armouring layer of armouring profiles wound with winding angles $\alpha_i$ relative to the center axis, the at least two armouring layers defining an innermost and an outermost armouring layer relative to the liner,
c) providing that the winding angle relative to the pipe axis of the innermost armouring layer $\alpha_{innermost}$ is larger than the winding angle of the outermost armouring layer $\alpha_{outermost}$,
d) providing at least one fibrous layer surrounding the outermost armouring layer wherein the fibrous layer comprises at least two fibrous cords wound on an underlying layer.

This has the advantage of providing an improved freedom of construction and manufacturing compared to prior art solutions. The inventive method provides an improved manufacturing flexibility because only one type of cord may be used for a multitude (or all) of pipe dimensions and loads. This has its origin in that the strength and stiffness of the layer is determined by the density, the winding angle, possible overlap between individual cord turns and the number of cords used in the winding.

In an embodiment, in step d) the at least one fibrous layer is wound by guiding the fibrous cord in an adjustable guide, which has the advantage in providing better control and precision in the winding process.

In an embodiment, in step d) the at least one fibrous layer is wound with an even number of cords. In an embodiment, a fibrous layer is wound with two or more cords using an even number of bobbin holders, such as 2 or 10 or 16 or 48 bobbin holders. In an embodiment, a cord is guided from its bobbin holder by a cord guide. In an embodiment each cord is guided from its bobbin holder by an individual cord guide. In an embodiment, the cord guide controls the displacement of its corresponding cord on the pipe. A displacement of one cord width in a layer wound from two cords would lead to a tightly wound layer (all cords lying side by side in one layer), whereas a displacement of half the width of a cord in a layer wound from two cords would lead to an overlap of half a cord width between neighbouring cords and thus result in a two-layer structure.

In an embodiment, in step d) upon reaching an end of a fibrous cord, the end is joined with an end of a new fibrous cord, which has the advantage of providing a uniform, continuous layer structure in the pipe, by winding "endlessly". The ends may be joined by splicing the ends together. In an embodiment, the cord end of the (nearly) empty bobbin and a cord end of a new bobbin are placed in a chamber with a certain overlap. The chamber is closed and pressurized air is blown into the chamber, whereby the fibres of the two cords are entangled in a chaotic manner, thus locking the two ends together.

In an alternative embodiment, the cord end of the (nearly) empty bobbin and a cord end of a new bobbin are placed in a form tool end-to-end with a certain overlap. In an embodiment, an adhesive is applied between cord ends and the form tool, e.g. by applying the adhesive to the form tool (the form tool typically comprising two oppositely facing parts). The joining of the form tool(s) results in the adhesive being pressed around and into the two cord ends, thereby fixing them together.

In an embodiment, in step d) upon reaching an end of a fibrous cord, the end is joined with an end of a new fibrous cord by means of a knot.

The method outlined above and defined in the accompanying claims may preferably be used to manufacture a flexible pipe as described above and in the embodiments described below and as defined in the accompanying claims.

An object of the invention is achieved by the use of flexible pipe as described above and in the embodiments described below and as defined in the accompanying claims or by the use of a flexible pipe manufactured by a method as described above and in the embodiments described below and as defined in the accompanying claims.

In an embodiment, the use is for the transport of fluids in the form of liquids or gases, such as water, ammonia, hydrocarbons, such as oil or gas above or below sea level.

A flexible pipe and a method of its manufacturing:

An object of the invention is achieved by arranging that the outer radial armouring layer comprises fibres that are combined to cords or wires and wound on an underlying layer in the pipe using an adjustable winding device having an even number of bobbin holders. An object of the invention is further achieved by an effective joining method for the fibre cord or wire providing an unreduced strength of the cord or wire over the extension of the joint.

A flexible armoured pipe according to an embodiment of the invention comprises an inner liner (the inner liner e.g. providing a barrier against leakage of fluids being transported by the pipe) the liner being surrounded by one or more armouring layers, the armouring layers being composed by wound armouring profiles, wherein the outermost armouring layer (or layers) has (have) a considerably smaller winding angle—relative to a centre axis of the pipe—than the innermost layer or layers, and surrounded by a fibrous layer comprising two or more fibrous cords wound on an underlying layer (e.g. an intermediate layer) with an appropriate winding angle and axial setting (the fibrous cords e.g. comprising wound polyaromatic individual fibres, other polymer-based individual fibres, glass fibres or other inorganic individual fibres), the fibrous layer being surrounded by an outer sheath (the outer sheath e.g. providing a barrier against the surrounding environment).

An object of the invention is further achieved by a method of manufacturing a flexible armoured pipe as described in the preceding paragraph wherein the fibrous layer is wound with an even number of fibrous cords, which are guided to the pipe via an adjustable guide.

The pipe and the method as described in the two preceding paragraphs may be combined with the features described together with the flexible armoured pipe and the method of its manufacturing in the above sections "A flexible armoured pipe" and "A method pf manufacturing a flexible pipe", respectively, and in the corresponding claims, providing the same or similar advantages.

Further objects of the invention are achieved by the embodiments defined in the dependent claims and in the detailed description of the invention.

It should be emphasized that the term "comprises/comprising" when used in this specification is taken to specify the presence of stated features, integers, steps or components but does not preclude the presence or addition of one or more other stated features, integers, steps, components or groups thereof.

BRIEF DESCRIPTION OF DRAWINGS

The invention will be explained more fully below in connection with a preferred embodiment and with reference to the drawings in which.

The figures are schematic and simplified for clarity, and they just show details which are essential to the understanding of the invention, while other details are left out. Throughout, the same reference numerals are used for identical or corresponding parts.

MODE(S) FOR CARRYING OUT THE INVENTION

Figure 1:
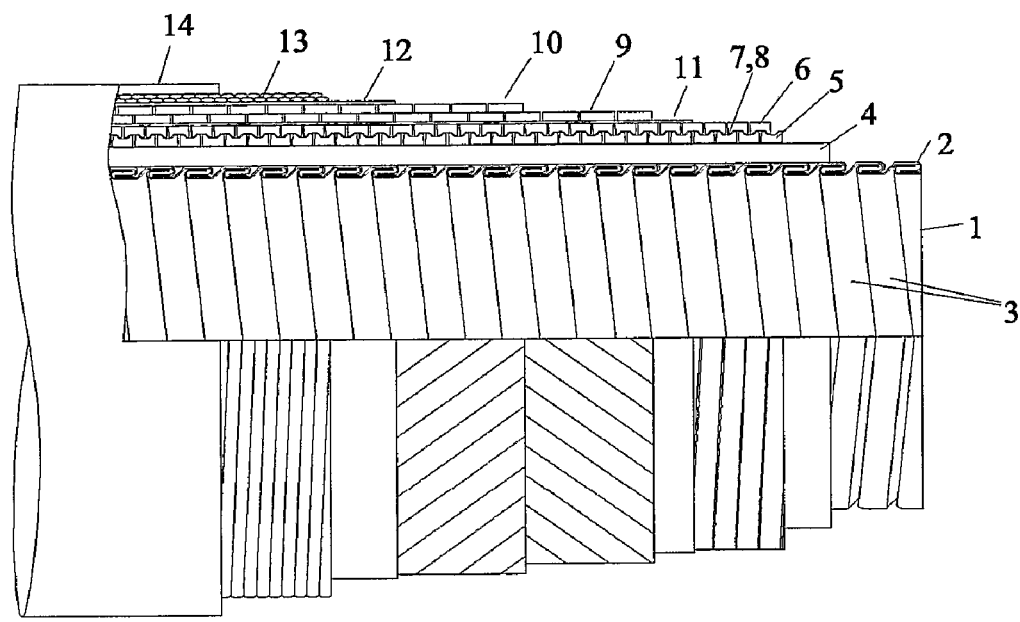
FIG. 1 shows a cut-out illustration of the construction of a flexible pipe according to a disclosed embodiment of the invention.

An embodiment of a flexible pipe according to the invention is shown in FIG. 1. The construction of the pipe is illustrated by the partial cut-out of the pipe.

The pipe comprises an inner armouring layer 1 (often referred to as an inner carcass) manufactured by winding and folding a metallic tape 2 in such a way that the turns of the tape interlock with each other and thereby limit the displacement between the turns. Around the carcass layer 1, a barrier layer 4 (also termed the inner liner) of a polymeric material has been formed (here by extrusion). Around the barrier layer 4, two armouring layers 5, 6 comprising armouring profiles (here of metallic materials) 7, 8, where the profile 7 of the innermost 5 of the two armouring layers matches the profile 8 of the outermost 6 of the two armouring layers. These two armouring layers 5, 6 have a relatively large winding angle relative to a center axis of the pipe (here of more than 80°). Around these armouring layers 5, 6 two additional armouring layers 9, 10 are wound with a relatively smaller winding angle (here between 25° and 60°). Between the armouring layers, optional and relatively thinner layers may be inserted e.g. to lower the friction between the layers, here illustrated in the form of layer 11 between armouring layers 6 and 9. Such intermediate layers may typically be made of a polymer material and be applied by extrusion or winding. Similarly, a polymer based layer (here comprising wound polymer based tape) 12 may be applied around the outermost 10 of the additional armouring layers. On the underlying layer (here polymer layer 12) one or more layers (here two are shown) 13 comprising fibrous cords is wound. Finally, an outer barrier sheath 14 is shown around the fibrous layer 13.

The armouring layers 5, 6 represent the 'radial armouring' mainly protecting the pipe against expansion due to the internal pressure of the fluid being transported by the pipe. The armouring layers 9, 10 represent the 'axial armouring' or 'tensile armouring' mainly protecting the pipe against deformation in a longitudinal (axial) direction of the pipe.

Figure 2:
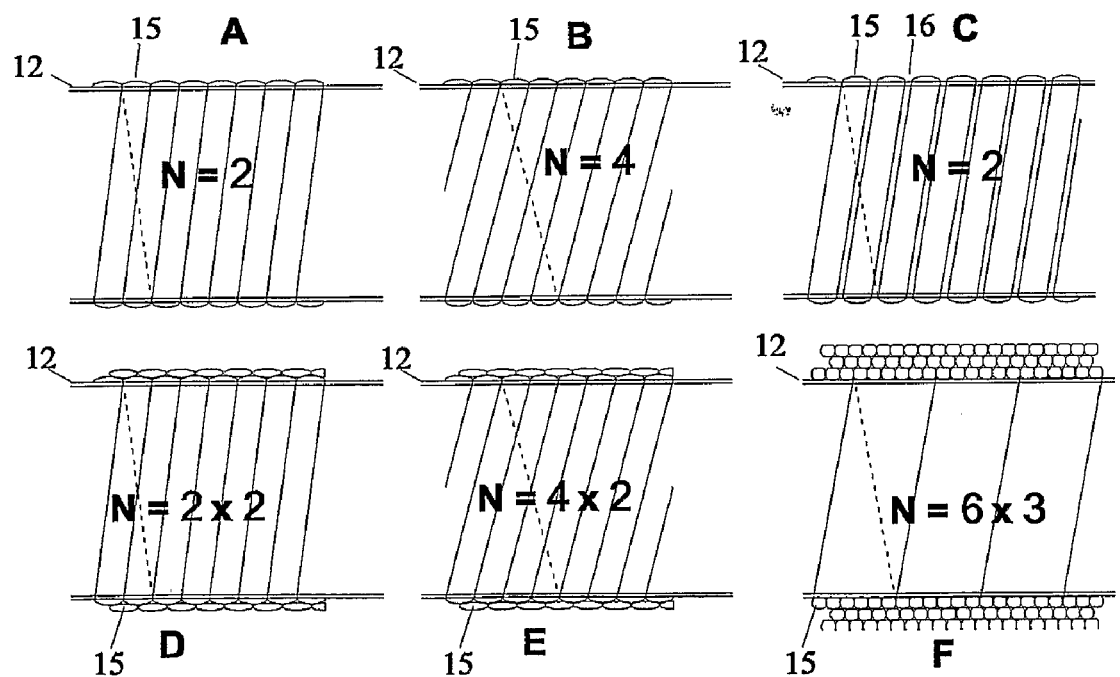
FIG. 2 shows six different constructions of a fibrous layer according to disclosed embodiments of the invention (FIGS. 2A-2F)

FIG. 2 shows 6 different schematic constructions of a fibrous layer according to the invention. The fibrous layer may preferably be wound from cords comprising aramide fibres (polyaromatic fibres). The layer denoted 12 symbolise the underlying layer on which the fibrous layer is wound, here in the form of a relatively thin polymer layer surrounding the outermost 10 of the axial armouring layers 9, 10 indicated in FIG. 1. Alternatively a fibrous layer may be wound directly on the underlying armouring layer. The fibrous layer (13 in FIG. 1) is wound from a number of cords 15 as shown in various configurations in FIGS. 2A-2F.

FIG. 2A shows a fibrous layer made of 2 tightly wound cords 15. FIG. 2B shows a fibrous layer made of 4 tightly wound cords 15 having no overlap. FIG. 2C shows a fibrous layer made of 2 cords 15 wound with a spacing 16 between the cords. FIG. 2D shows a fibrous layer made of 4 tightly wound cords 15 with a displacement between two pairs of cords relative to the axis of the pipe whereby the winding results in two layers of cords. FIG. 2E shows a fibrous layer made of 8 tightly wound cords 15 with a displacement between two sets of 4 cords whereby the winding results in two layers of cords. FIG. 2F shows a fibrous layer made of 18 tightly wound cords 15 with an axial displacement between three sets of 6 cords whereby the winding results in three layers of cords.

FIG. 2A-F shows the advantage of providing a different "degree of radial reinforcement"/radial stiffness by winding with the same type and size of cord.

Aramide fibres for use in fibrous cords according to the invention may e.g. be known under the trade names Twaron, Technora (both of Teijin Twaron BV, Arnhem, The Netherlands) or Kevlar (of DuPont).

Fibrous cords for use in a flexible pipe according to the invention are e.g. described in ISO-1139-1973. Fibrous cords for use in a flexible pipe according to the invention may e.g. be bought from Teijin Twaron BV (Arnhem, The Netherlands), DuPont, Saint Gobain, Roblon A/S (Frederikshavn, Denmark), etc.

Figure 3:
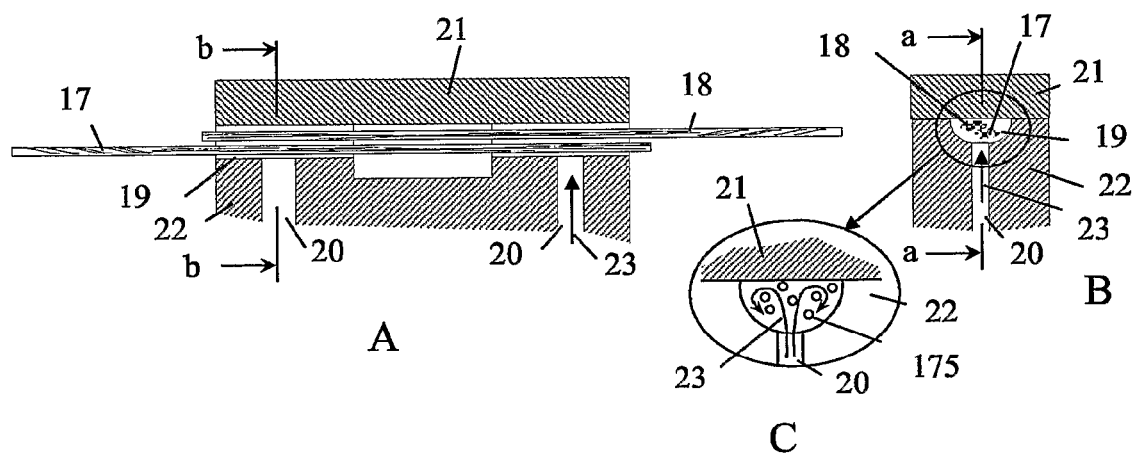
FIG. 3 shows longitudinal and transversal cross sectional views of a splicing chamber with a joint between two fibrous cords according to disclosed embodiments of the invention, FIG. 3A being a longitudinal view, FIG. 3B a transversal view and FIG. 3C a detailed view from FIG. 3B of the splicing chamber.

FIG. 3 shows longitudinal and transversal cross sectional views of a splicing chamber with two cord ends placed in it. FIG. 3A is a longitudinal cross section of the splicing chamber (along a-a' on FIG. 3B) and FIG. 3B is a transverse cross section through one section of the splicing chamber (b-b' on FIG. 3A). FIG. 3C shows an enlarged view of details of the splicing chamber on FIG. 3B. The cord ends 17, 18 are placed in the chamber made by a cavity 19 between the parts 21 and 22. Air channels, 20, are oriented perpendicular to the fibres of the cords. Pressurised air 23 is injected through the channels 20, and creates an entanglement of the fibres 175, as shown on the detailed view of FIG. 3B.

Figure 4:
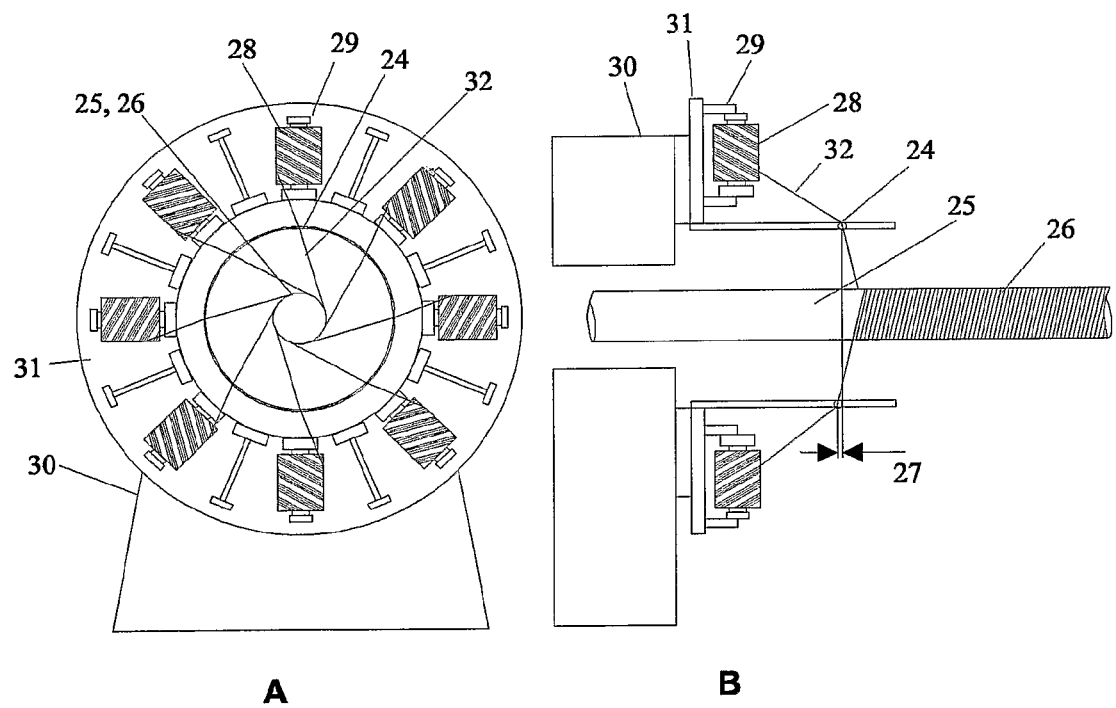
FIG. 4 shows a machine for manufacturing a fibrous layer according to disclosed embodiments of the invention in two views one perpendicular to a longitudinal axis of the pipe (FIG. 4A) and one along a longitudinal axis of the pipe (FIG. 4B)

FIG. 4 shows a sketch of a machine for manufacturing a fibrous layer according to the invention (cf. e.g. layer 13 in FIG. 1 and the various examples in FIG. 2). The sketch illustrates a method of manufacturing the fibrous layer. Only details relevant to the present invention are shown. FIG. 4A is a view of the machine perpendicular to the axis of the flexible pipe. FIG. 4B is a view of the machine along the axis of the flexible pipe. The winding machine 30 comprises a turntable 31 on which a number of bobbin holders 29, preferably an even number. In FIG. 4A sixteen bobbin holders are shown of which eight are shown to be in use. The cord bobbins 28 are circulated around the pipe 25 by the turntable 31. The individual cords 32 are guided from the cord bobbins to the pipe via an adjustable guide 24. The adjustable guide enables a displacement 27 of the cords relative to each other so that the wound layer 26 comprises several cords on top of each other (cf. also FIGS. 2D-2F).

Figure 5:
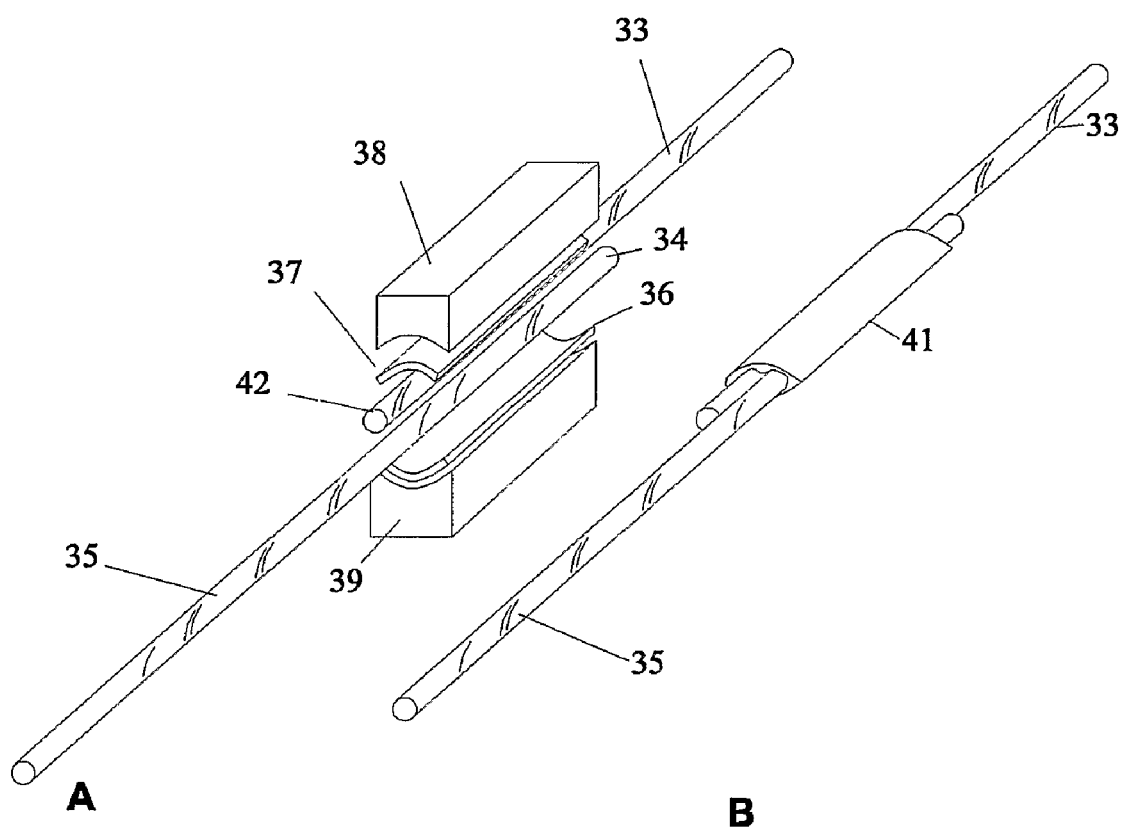
FIG. 5 shows components of a joint between two cords according to disclosed embodiments of the invention (FIG. 5A) and the resulting joint (FIG. 5B)

FIG. 5 schematically illustrates a method of joining cords during the winding process. FIG. 5A shows an exploded isometric illustration of the cords 33, 35 whose ends 34, 42 are placed with an overlap between two pieces of adhesive material held together by two form parts 38, 39. The form parts are closed around the ends of the cords and the adhesive material is activated, e.g. by the application of heat to the form parts (or by other methods known in the art). FIG. 5B shows the finished joint 41 joining the two cords 33, 35.

The adhesive can be carried by a reinforcing mesh (e.g. braided fibres or fine metallic wires). The adhesive can be of the hot melt type (thermoplastic polymers), a cross linking chemical that interacts with the surface (or surface treatment) of the fibres, or any other bonding agent that will provide a strong transfer of load from one cord to another.

Figure 6:
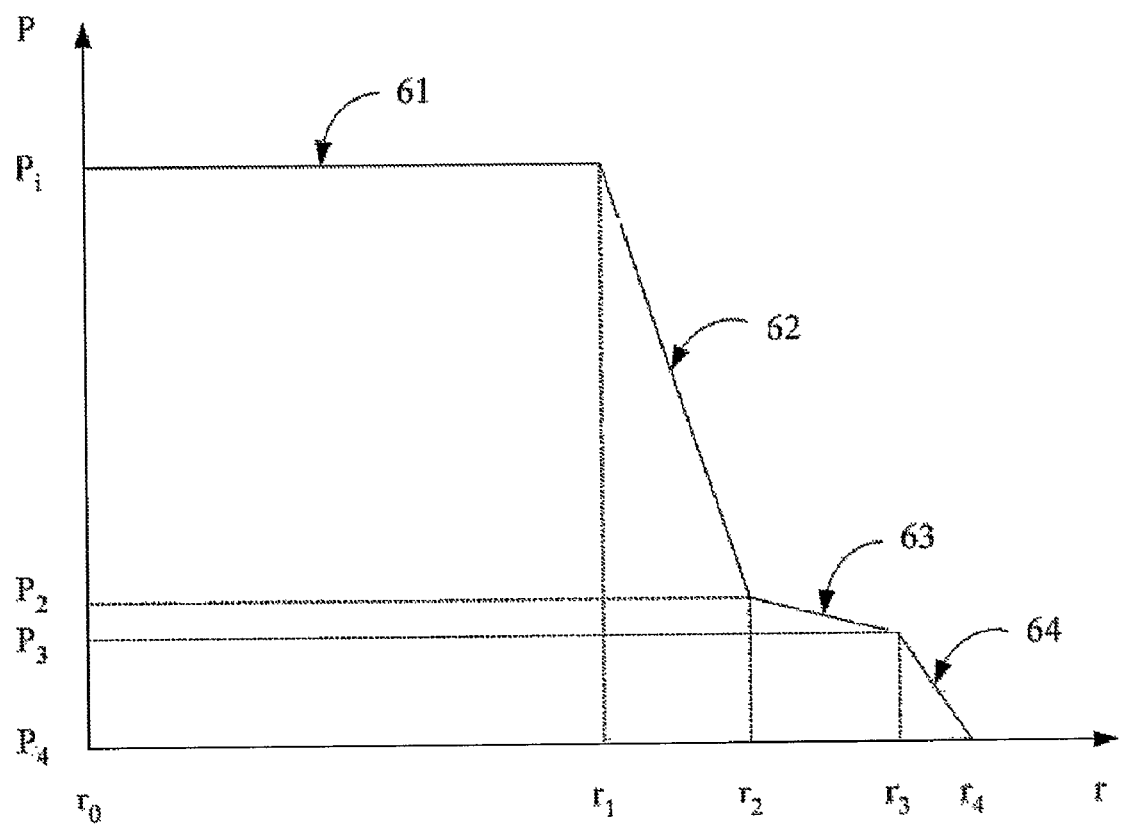
FIG. 6 shows a schematic illustration the distribution of the absorption of the inner pressure of the various layers of a flexible pipe according to disclosed embodiments of the invention.

FIG. 6 shows a schematic illustration the distribution of the absorption of the inner pressure of the various layers of a flexible pipe according to the invention.

The radial pressure level $P_i$ 61, represent the internal pressure in the pipe. A large portion of this pressure is carried by the radial armouring layer(s), positioned (relative to the pipe axis) from $r_1$ to $r_2$ in the pipe structure. The pressure drop $(P_i-P_2)$ across the radial armouring is represented by the slope 62 of the line from pressure level $P_i$ to $P_2$. The axial armouring layer(s) are not very efficient in carrying internal pressure in the radial direction, due to its somewhat lower winding angles. Therefore only a minor part $(P_2-P_3)$ of the radial pressure $(P_i-P4, P_4=0)$ is carried by this/these layer(s) (located from $r_2$ to $r_3$ in the pipe). This is represented by the minor drop in pressure level from $P_2$ to $P_3$, cf. slope 63 of the line connecting pressure levels $P_2$ and $P_3$. The fibrous layer, located from $r_3$ to $r_4$, outside the axial armouring is wound at an angle similar to that of the radial armour, however, as the stiffness of this layer is lower that that of the radial armouring material the slope 64 is smaller than the slope 62 of the radial armouring. The fibrous layer will carry the remaining portion $(P_3-P_4, P_4=0)$ of the radial pressure $(P_i-P_4, P_4=0)$ to yield a structure in equilibrium.

The pressure changes versus radial distance in the pipe may of course take on other functional dependencies than strictly linear as shown in FIG. 6.

The radial distances and pressure differences of FIG. 6 are not to scale.

In preferred embodiments, the relative pressure differences for a pipe subjected to internal pressure loading only are distributed as indicated below:

$pf_1=(P_i-P_2)/(P_i-P_4)$ is in the range 0.7-0.9, and/or
$pf_2=(P_2-P_3)/(P_i-P_4)$ is in the range 0.15-0.25, and/or
$pf_3=(P_3-P_4)/(P_i-P_4)$ is in the range 0.01-0.05.

The objective of the invention is fulfilled when $pf_3=(P_3-P_4)/(P_i-P_4)<0.05$.

Some preferred embodiments have been shown in the foregoing, but it should be stressed that the invention is not limited to these, but may be embodied in other ways within the subject-matter defined in the following claims.

The invention claimed is:

1. A flexible armoured pipe having a center axis and comprising an inner liner surrounded by at least two armouring layers comprising a radial armouring composed by wound armouring profiles, and an axial armouring, the radial and axial armouring each comprising at least one armouring layer of armouring profiles wound with winding angles $\alpha_i$ relative to the center axis, the at least two armouring layers defining an innermost and an outermost armouring layer relative to the liner wherein the winding angle of the innermost armouring layer $\alpha_{innermost}$ is larger than the winding angle of the outermost armouring layer $\alpha_{outermost}$, wherein said outermost armouring layer constitutes or is part of an outer group of layers constituting said axial armouring and providing protection against axial deformations of the flexible pipe, and wherein the winding angle $\alpha_{outermost}$ of the armouring layer (s) of the outer group of layers is/are in the range from 25° to 65°, the pipe further comprising at least one fibrous layer surrounding the outermost armouring layer wherein the fibrous layer is made of a material with a stiffness which is 60% or lower than the stiffness of the wound armouring profiles of the radial armouring, and comprises at least two fibrous cords wound on an underlying layer, wherein the winding angle $\alpha_{fibrous}$ of the at least two fibrous cords is larger than 70°, and wherein some of the layers of the flexible pipe are un-bonded.

2. A flexible pipe according to claim 1 wherein the innermost armouring layer constitutes or is part of an inner group of layers constituting the radial armouring and providing protection against radial deformations of the flexible pipe.

3. A flexible pipe according to claim 2 wherein the winding angle(s) $\alpha_{innermost}$ of the armouring layer(s) of the inner group of layers is/are at least 10° larger than the winding angle(s) $\alpha_{outermost}$ of the armouring layer(s) of the outer group of layers.

4. A flexible pipe according to claim 2 wherein the winding angle(s) $\alpha_{innermost}$ of the armouring layer(s) of the inner group of layers is/are in the range 75° to 90°.

5. A flexible pipe according to claim 1 wherein the winding angle $\alpha_{fibrous}$ of the at least two fibrous cords is adapted to the winding angles $\alpha_i$ of the armouring layers of the inner and outer groups of layers to provide a fibrous armouring layer to protect the axial armouring against radial deformation.

6. A flexible pipe according to claim 1 wherein the underlying layer is an intermediate layer located between the outermost armouring layer and the fibrous layer or an innermost fibrous layer.

7. A flexible pipe according to claim 1 wherein the pipe further comprises an outer sheath surrounding the at least one fibrous layer.

8. A flexible pipe according to claim 1 wherein the fibrous cords have a Young's modulus smaller than 120 GPa.

9. A flexible pipe according to claim 1 wherein the fibrous cords of the fibrous layer surrounding the outermost armouring layer are made of a material with a Young's modulus that is lower than that of the material from which the armouring profiles of the innermost, radial armouring layer is made.

10. A flexible pipe according to claim 1 wherein the fraction of the internal pressure loading $pf_1=(P_i-P_2)/(P_i-P_4)$ taken up by the innermost, radial armouring layer is in the range from 0.7 to 0.9.

11. A flexible pipe according to claim 1 wherein the fraction of the internal pressure loading $pf_2=(P_2-P_3)/(P_i-P_4)$ taken up by the outermost, axial armouring layer is in the range from 0.15 to 0.25.

12. A flexible pipe according to claim 1 wherein the fraction of the internal pressure loading $pf_3=(P_3-P_4)/(P_i-P_4)$ taken up by the at least one fibrous layer is $\leq 0.05$.

13. A flexible pipe according to claim 1 wherein the fibrous cords are made of wound individual fibres or filaments.

14. A flexible pipe according to claim 13 wherein the individual fibres are selected from the group consisting of polyaromatic fibres, other polymer- or co-polymer based fibres, glass fibres and other inorganic fibres.

15. A flexible pipe according to claim 13 wherein the individual filaments are metallic.

16. A flexible pipe according to claim 1 wherein a part of the fibrous cords are wound with an axial setting relative to a corresponding part of fibrous cords to provide an overlap between the fibrous cords.

* * * * *